(12) United States Patent
Franco

(10) Patent No.: US 8,001,753 B2
(45) Date of Patent: Aug. 23, 2011

(54) GRASS RAKING SYSTEM

(76) Inventor: Carlos Franco, Dracut, MA (US)

( * ) Notice: Subject to any disclaimer, the term of this patent is extended or adjusted under 35 U.S.C. 154(b) by 101 days.

(21) Appl. No.: 12/200,365

(22) Filed: Aug. 28, 2008

(65) Prior Publication Data

US 2010/0050586 A1    Mar. 4, 2010

(51) Int. Cl.
*A01D 34/00* (2006.01)

(52) U.S. Cl. ......... 56/15.9; 56/16.1; 56/193; 56/400.16; 172/811

(58) Field of Classification Search .............. 56/1, 16.1, 56/400.04, 400.05, 400.14, 400.15, 15.9, 56/193, 400.16; 37/231, 235; 172/811
See application file for complete search history.

(56) References Cited

U.S. PATENT DOCUMENTS

| | | | |
|---|---|---|---|
| 1,609,101 A | 11/1926 | Asio | |
| 1,633,802 A | 6/1927 | Wright | |
| 1,662,785 A | 3/1928 | Robertson | |
| 2,011,005 A | 8/1935 | Mack | |
| 2,021,821 A | 11/1935 | Wescott | |
| 2,023,697 A | 12/1935 | Reynolds | |
| 2,053,506 A | 9/1936 | Welf | |
| 2,143,402 A | 1/1939 | Baker | |
| 2,157,620 A | 5/1939 | McGrath et al. | |
| 2,256,255 A | 9/1941 | Bangert | |
| 2,275,359 A | 3/1942 | Gargiule et al. | |
| 2,275,360 A | 3/1942 | Gargiule et al. | |
| 2,304,873 A | 12/1942 | Bangert | |
| 2,458,416 A | 1/1949 | Pimentel | |
| 2,712,212 A | 7/1955 | Sears | |
| 2,722,795 A | 11/1955 | Warner | |
| 2,751,741 A * | 6/1956 | Carson | 56/400.04 |
| 2,794,309 A | 6/1957 | Tabac | |
| 2,865,161 A | 12/1958 | Nygren | |
| 2,898,724 A * | 8/1959 | Robinson | 56/16.1 |
| 3,015,929 A | 1/1962 | Bright | |
| 3,024,587 A | 3/1962 | Warnke | |
| 3,438,183 A | 4/1969 | Puretic | |
| 3,646,736 A | 3/1972 | Hutchins | |
| 3,753,341 A | 8/1973 | Berg, Jr. et al. | |
| 3,777,460 A | 12/1973 | Mokros | |
| 4,151,701 A * | 5/1979 | Marto | 56/16.1 |
| 4,322,936 A * | 4/1982 | Whitney | 56/16.1 |
| 4,406,113 A | 9/1983 | Mullins | |
| 6,122,904 A | 9/2000 | Garcia de Alba | |
| 6,199,356 B1 | 3/2001 | Morenco | |
| 6,308,505 B1 * | 10/2001 | Beckett | 56/16.7 |
| 6,494,028 B2 * | 12/2002 | Moore | 56/17.1 |
| 2007/0125058 A1 * | 6/2007 | Clifton | 56/400.16 |

* cited by examiner

*Primary Examiner* — Alicia M Torres
(74) *Attorney, Agent, or Firm* — Morse, Barnes-Brown & Pendleton, P.C.; Sean D. Detweiler, Esq.

(57) ABSTRACT

A raking attachment for a riding mower supports raking elements in a forward path of a cutting deck. The raking attachment includes a forward extending frame formed by longitudinal frame members positioned with first ends rigidly attached to a riding mower frame and with a second end forming attaching points at a fixed height off the ground. A transverse frame is pivotally attached to the forward extending frame by pivot posts. A rake assembly with at least one row of flexible rake tines disposed across the entire transverse width of the cutting deck is attached to the transverse frame and pivots therewith to contact the ground surface for raking. The rake tines can be raised to a non-raking position or the downward force of the rake tines against the ground surface can be varied by varying the pivot angle of the transverse frame over a range of pivot angles.

11 Claims, 5 Drawing Sheets

GRASS RAKING SYSTEM

BACKGROUND OF THE INVENTION

1. Field of the Invention

The present invention relates to a front mounted raking attachment for a power lawnmower or other lawn care device. In particular, the front mounted raking attachment is supported in a forward path of a grass cutting deck to raise grass to a uniform height prior to cutting.

2. Description of the Related Art

The benefits of raking grass just prior to cutting it are known. One benefit is that the grass is stood up to a uniform height so that grass is cut evenly by a cutting blade. Another benefit is that the raking action dislodges dead grass, thatch, leaves and other debris from the grass and may also aerate the grass and the ground surface. An example raking attachment configured to rake grass in a forward path of a non-riding lawnmower grass cutting deck is disclosed in U.S. Pat. No. 6,122,904 to Garcia de Alba entitled RAKE ATTACHEMENT FOR POWER LAWNMOWER, dated Sep. 26, 2000 which discloses a non-riding lawnmower equipped with two rake heads disposed to rake grass in a forward path of a grass cutting deck. The '904 patent also discloses a u-shaped tubular frame with legs connected by a bight portion. The two rake heads attach to the bight portion at a fixed distance in front of the lawnmower cutting deck and are oriented to rake during forward motion of the lawnmower. Each leg includes a clamp for attaching the leg to the lawnmower and a cross bar attached to each leg pushes rake tines against the ground. While the invention disclosed by Garcia de Alba positions rake heads in a forward path of a grass cutting deck, the rake heads are fixed in one position with the rake tines forced against the ground surface with a constant force. One problem with this configuration occurs when the direction of movement of the lawnmower is reversed causing the rake tines to become logged in grass or against the ground surface. The logged rake tines may impede reverse movement of the lawnmower as well as damage the rake tines. Another drawback of the invention disclosed by Garcia de Alba is that the contact force of the rake heads against the ground surface or grass is substantially constant and there may be a need to adjust the rake tine contact force for tall grass, excess leaves or other lawn conditions.

An example raking attachment configured to rake grass in a forward path of a riding lawnmower grass cutting deck is disclosed in U.S. Pat. No. 3,646,736 to Hutchins entitled ATTACHEMENT FOR A RIDING-TYPE LAWNMOVER, dated Mar. 7, 1972 which discloses a riding lawnmower equipped with a pivoted forward extending frame with a traverse extending rake assembly at its forward end and a freely suspended transverse magnet bar assembly at its intermediate position and a lever is provided to pivot the frame to a lifted non-operating position. A front end of the forward extending frame is supported with ground engaging support wheels which support vertical rake teeth that extend almost to the ground surface for straightening up blades of grass as it passes over them. It is also disclosed that the ground engaging wheels are not required and that the forward extending frame can be supported in a horizontal working position by engaging a pin mounted on the lever in a properly positioned retaining notch. While the invention disclosed by Hutchins positions a forward extending frame to support rake teeth in a forward path of a grass cutting deck and provides mechanisms for pivoting the frame to lift the rake teeth, the rake teeth disclosed by Hutchins are not in contact with the ground surface and there is no way to vary the height or downward force to the rake teeth with respect to the ground surface.

There is a need in the art to provide a forward extending raking attachment for raking grass and the ground surface in the forward path of movement of a power lawn care device with a configuration that allows a user to vary the height of the rake tines and or the contact force that the rake tines make with grass of the ground surface to adjust the raking action to various lawn conditions. In addition, there is a need to lift the rake tines while moving in reverse or to lift the rake tines to remove debris from under the rake tines.

SUMMARY OF THE INVENTION

It is an object of the present invention to provide apparatus and method for cutting grass to a uniform length by raising the grass to a uniform height just prior to cutting.

It is an object of the present invention to provide apparatus and method for loosening debris such as dead grass, thatch, pine needles and leaves in a path of forward movement of a power lawn care device.

It is an object of the present invention to provide apparatus and method for increasing the operating speed of a power lawn care device while still providing a high quality result.

It is an object of the present invention to provide a power lawnmower raking attachment that operates with an adjustable raking force.

The present invention overcomes the problems cited in the prior art by providing a raking attachment 150 for a power lawn care device 102, such as a rider or self-propelled mower or other lawn care device. The raking attachment 150 includes a forward extending frame 200 formed by two longitudinal frame members 202 connected together in a rectangular frame by two transverse bracing members 210. The longitudinal frame members include first ends 204 for rigidly attaching to opposing sides a mower frame 104 and second ends 206 extending longitudinally forward from the mower frame to provide attaching points 208 rigidly supported in a path of forward movement of a mower cutting deck 108 at a substantially fixed height above the ground surface. Alternately, the forward extending frame may comprise a single beam attached to the mower frame and providing a single attaching point in a path of forward movement of a mower cutting deck. The forward extending frame 200 may also include separate frame mounts 214 that remain attached to the mower frame 104 and couple with the first ends 204 of the longitudinal frame member 202.

The raking attachment 150 further includes a transverse frame 220, pivotally attached to the forward extending frame 200 at the attaching points 208. The transverse frame includes two substantially parallel and opposing transverse frame members, 222 and 224 connected together in a rectangular frame by two longitudinal bracing members 226 and 228. Alternately the transverse frame 220 may be formed a by a single transverse frame member. The transverse frame 220 includes left 230 and right 232 pivot posts attached to the front transverse frame member 222 and the pivot posts include a pair of coaxial through holes 234 near top ends thereof.

A rake assembly 240 including rake elements attach to the transverse frame 220. The rake elements include two upper rake heads 242 and two lower rake heads 244 with the two upper rake heads 242 disposed side by side across a transverse width of the rake assembly and the two lower rake heads 244 disposed side by side across a transverse width of the rake assembly and slightly longitudinally forward of the two upper rake heads 242. Each rake element includes relatively stiff mounting portion 246 and a row of flexible rake tines 248 fanning out from the relative stiff mounting portion 246. The upper rake heads 242 forms a first row 252 of flexible rake tines disposed across the entire transverse width of the cutting deck and the lower rake heads 244 form a second row 254 of flexible rake tines disposed across the entire transverse width of the cutting deck.

A pivot rod 266 pivotally extends through the first attaching points 208 and through the pair of coaxial through holes 234. The pivot rod 266 is fixedly attached to the transverse frame by connecting rods 274 passed through the pivot posts 230, 232 and the pivot rod 266, however, the pivot rod 266 pivots with respect to the first attaching points 208. A handle bracket 268 is fixedly attached to the pivot rod 266 and couples the pivot rod with a pivot handle 262. The pivot handle 262 extends to a position accessible to a user operating the riding mower 102 and engages with a handle support element 264, 286 attached to the longitudinal frame 200 for engaged with the pivot handle 262 to support the pivot handle at various support positions with each of the various support positions corresponding with a different pivot angle in the range of pivoting motion of the rake assembly. Accordingly, the rake assembly can be pivoted to place the rows of rake tines in contact with the ground surface with different downward forces or with different raking heights or to lift the rake assembly away from the ground surface to a non-raking position.

The present invention further overcomes the problems cited in the prior art by providing a method of raking that includes supporting a forward extending frame 200 to provide attaching points 208 in a path of forward movement of a cutting deck of a lawnmower 102. A transverse frame 220 is pivotally attached to the forward extending frame 200 at the attaching points 208. A rake assembly 240 is supported on the transverse frame and the rake assembly includes a row of flexible rake tines 252 disposed across the entire transverse width of a cutting deck of the lawnmower in the forward path of the cutting deck. The transverse frame 220 and rake assembly 240 are pivoted to different raking positions according to the raking application. Different raking positions place the rake tines in contact with the ground surface with different downward forces or with different raking heights. The transverse frame 220 and rake assembly 240 are also pivoted to a non-raking position when raking is undesirable.

BRIEF DESCRIPTION OF THE DRAWINGS

The features of the present invention will best be understood from a detailed description of the invention and a preferred embodiment thereof selected for the purposes of illustration and shown in the accompanying drawings in which.

DESCRIPTION OF THE PREFERRED EMBODIMENT

Figure 1:
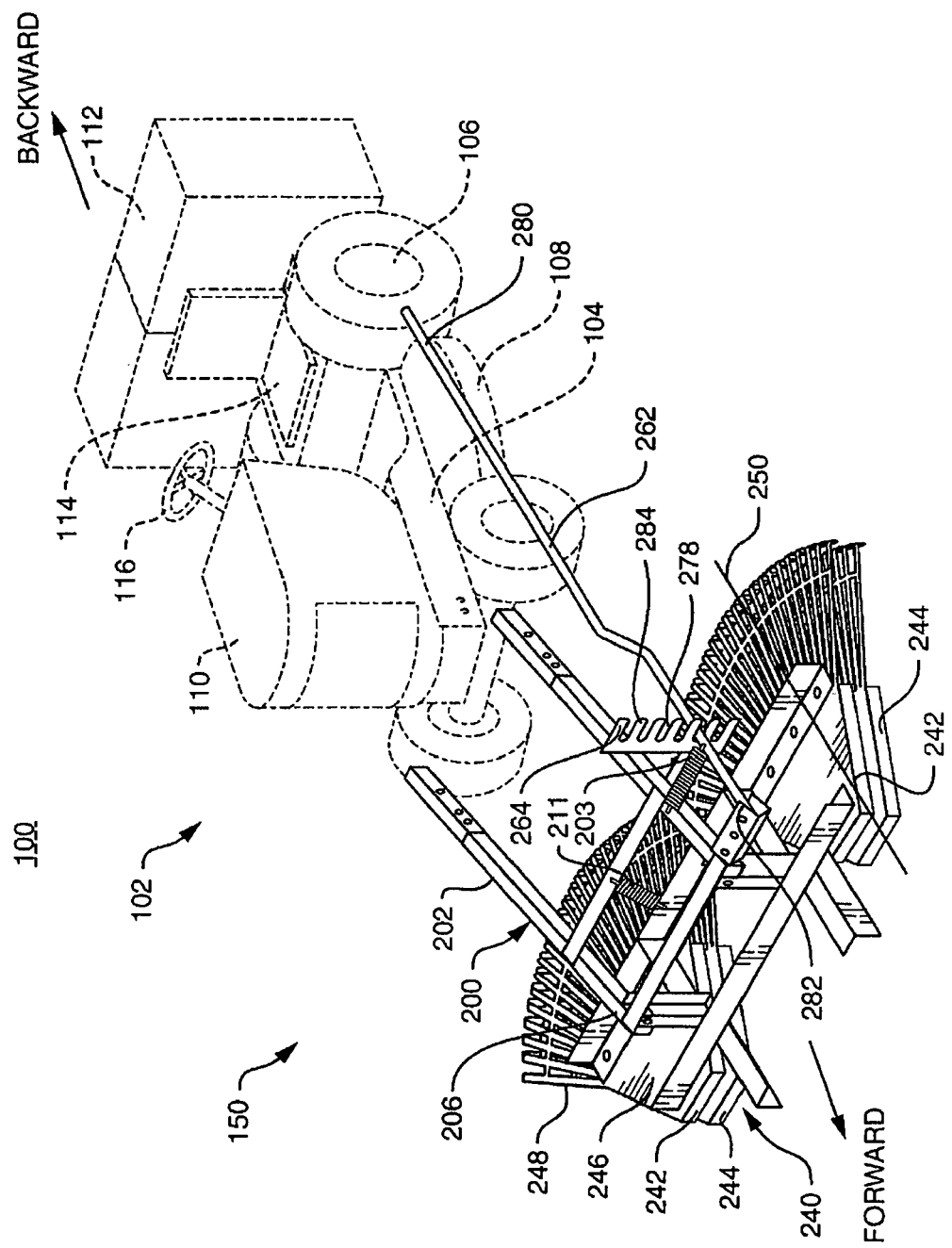
FIG. 1 illustrates a front isometric view of an improved lawn care device according to the present invention.

Referring to FIG. 1, an improved lawn care device 100 according to the present invention includes a raking attachment 150 for attaching to and extending longitudinally forward of a power lawnmower 102 or other power lawn or garden care device such as a power vacuum system, power spreader, or any other power lawn or garden care device used to cut grass, collect debris, plant seed, spread fertilizer or otherwise operate on a ground surface. In a preferred embodiment, the raking attachment 150 is configured to rake the ground surface or grass just above the ground surface in a path of forward movement of a power lawnmower 102. The raking action raises the grass to a uniform height just prior to cutting by the lawnmower to therefore cut all the grass to a more uniform length. The raking attachment 150 of the present invention also functions to dislodge dead grass, thatch, pine needles, leaves and other loose debris from grass in a path of forward movement of the power lawnmower 102 and the dislodged debris may be collected if the power lawnmower is also equipped with a vacuum cutting deck 108 and grass collecting bin 112. The raking attachment 150 therefore improves the overall performance of the lawn care device by cutting grass to a uniform height and by loosening debris that would otherwise not be collected by the vacuum cutting deck 108 collection bins 112. In addition, applicants have found that the raking attachment of the present invention allows the power lawnmower 102 to be operated at higher forward mowing velocities than conventional power lawnmowers without degrading the lawn care result.

In further aspects of the present invention, the raking attachment 150 is configured to be easily attached to and removed from a mower frame 104 by a single user to facilitate separate storage and or transport of the power lawnmower 102 and the raking attachment 150 as required.

Figure 3:
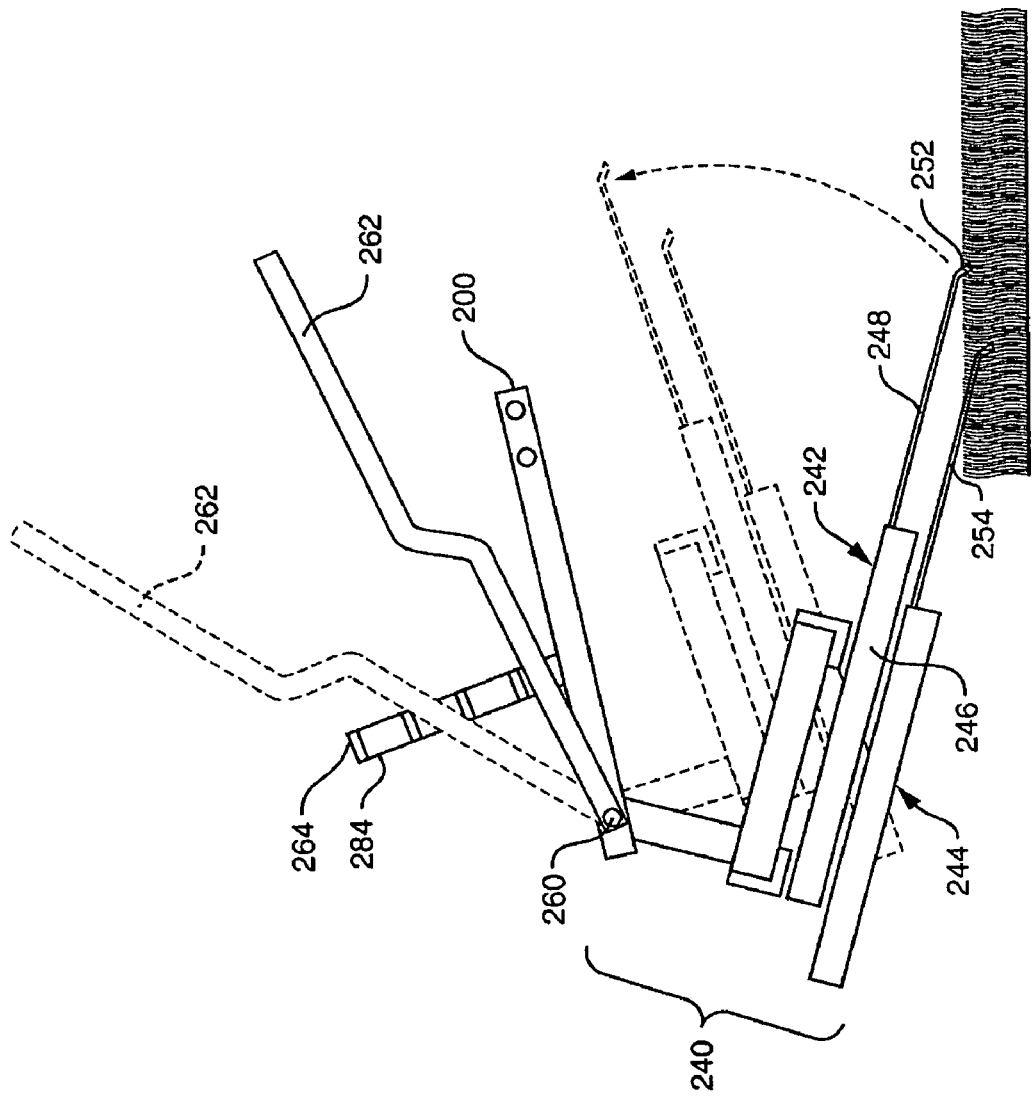
FIG. 3 illustrates a side view of a raking accessory shown in two positions according to the present invention.
Figure 4:
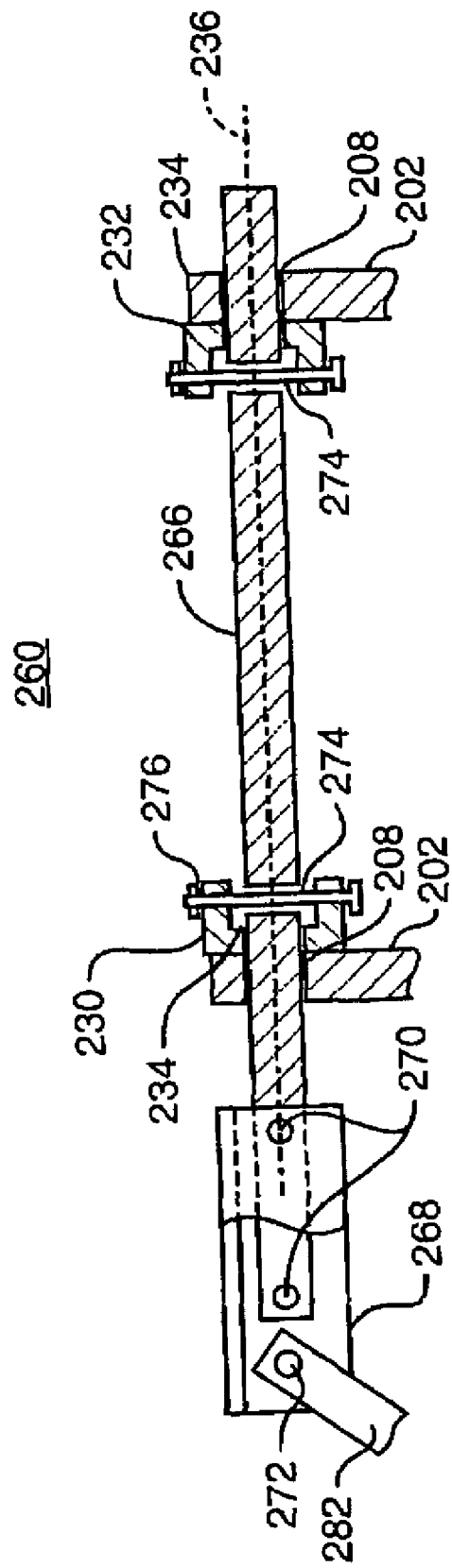
FIG. 4 illustrated a top section view taken through a raking accessory pivot joint according to the present invention.

In still further aspects of the present invention, the raking attachment 150 is configured with a pivot assembly 260 depicted in FIGS. 3 and 4 for pivoting a transverse frame 220 and rake assembly 240 over a range of pivot angles according to various positions of a pivot handle 262. Various pivot angles may be selected when a user adjusts the position of a pivot handle 262 and a handle holding bracket 268 holds pivot angle may be varied to lift the rake assembly 240 away from the ground when not in use or when moving the power lawnmower 102 in reverse, or to vary the raking height or ground contact force of rake elements during raking.

Referring to FIG. 1, a preferred embodiment of the present invention includes a power lawnmower 102 having a mower frame 104 supported above a ground surface on four wheels 106. Other power lawn and garden care devices may include two, three or more than four wheels without deviating from the present invention. The power lawnmower 102 includes a grass cutting deck 108 attached to the mower frame 104. The cutting deck 108 includes a cutting blade, not shown, and may include other blades or other elements, e.g. flexible strands of wire, filament, or the like, for cutting grass. The cutting deck 108 may also be configured to collect grass clippings and other debris by forcing debris into a collection bin 112 and the power lawnmower 102 may also include a vacuum system or the like for collecting debris proximate to the cutting deck even when a cutting blade is not present or in use. More generally, other power lawn and garden care devices may not include a cutting blade but may include a lawn care deck comprising a vacuuming, spreading, planting or other device that performs power lawn and garden tasks. The power lawnmower 102 includes a motive drive system 110 attached to the mower frame 104 and interconnected with at least one of the four drive wheels 106 for driving the power lawnmower 102 in a forward drive direction and preferably also in a rearward or reverse driving direction. The motive drive system 110 also interconnects with the grass cutting deck 108 to drive a cutting blade, vacuum system or any other devices for cutting grass, collecting debris and or otherwise performing lawn or garden care tasks. In addition, the preferred power lawnmower 102 also includes a user seat 114, a steering wheel 116 and debris collecting bins 112. The raking attachment of the present invention may also be used with a self-propelled lawnmower of lawn and garden care device.

Figure 2:
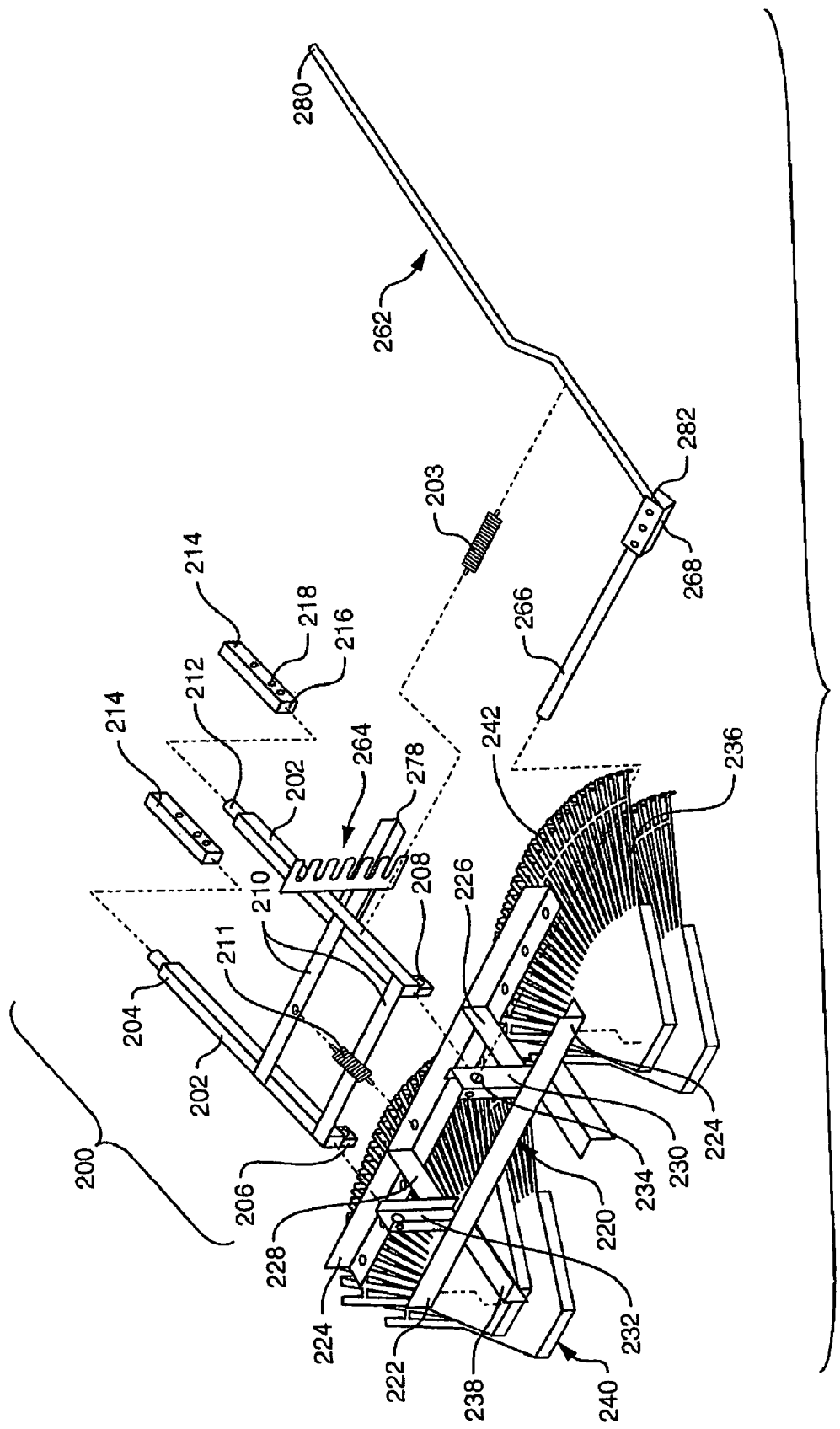
FIG. 2 illustrates an exploded isometric view of a raking accessory according to the present invention.

Referring now to FIGS. 1 and 2, the raking attachment 150 includes a forward extending frame 200 comprising one or more longitudinal frame members 202. Each longitudinal frame member 202 includes a first end 204, for rigidly attaching to the mower frame 104, and a second end 206 extending longitudinally forward from the first end 204 to provide attaching points 208. In the example forward extending frame 200 of the present embodiment, two substantially parallel longitudinal frame members 202 are fixedly interconnected by two substantially parallel transverse brace members 210 to form a rigid rectangular frame. The first end 204 of each of the longitudinal frame members 202 includes a male attaching element 212 extending longitudinally out therefrom. In addition, a pair of frame mounts 214 are fixedly attached to the mower frame 104 on opposing sides thereof and the frame mounts 214 remain substantially permanently affixed to the mower frame 104 by threaded fasteners or the like. In addition, each frame mount 214 includes a female attaching element 216 configured to receive the male attaching element 212 therein. The first ends 204 are attached to the frame mounts 214 by engaging the male and female attaching elements 212, 216. This aligns the longitudinal frame members 202 at a desired mounting angle with respect to the mower frame 104 and positions the second ends 206 at a desired height above the ground surface. The first ends 204 are fastened to the frame mounts 214 using a quick release fastening device, not shown, such as a pin, clamp, threaded fastener, or other suitable fastener installed through holes 218, slots or other apertures formed to engage the fastener with the first end 204 and the frame mount 214.

Generally, the longitudinal frame members 202 may be constructed from light weight hollow metal tubing e.g. square, round or rectangular aluminum or steel tubing and the transverse bracing members 210 may also comprise light weight metal tubing or thin bar stock. Alternately the forward extending frame 200 may comprise a unitary element molded from, metal, plastic or composite materials. In addition, the forward extending frame 200 may comprise a single bar mounted to the mower frame 104 at a center location and or other structures suitable to position one or more attaching points 208 forward of the power lawnmower or other power lawn care device at a predetermined height above the ground surface.

Referring now to FIGS. 1-3, the raking attachment 150 includes a transverse frame 220 and a rake assembly 240 attached thereto. The rake assembly 240 includes one or more rakes 242 and each rake 242 includes flexible rake tines 248 for raking the ground surface or for raking grass just above the ground surface. The transverse frame 220 attaches to the forward extending frame 200 at the attaching points 208 and a pivot assembly 260 allows the transverse frame 220 and attached rake assembly 240 to pivot through a range of pivot angles in order to pivot the rake assembly 240 between operating positions for raking, wherein the rake tines 252, 254 are raking grass and or the ground surface, and a non-operating position wherein the rake tines 252, 254 are lifted away from contact with the ground surface or grass.

Referring to FIG. 2, the transverse frame 220 includes opposing substantially parallel front 222 and rear 224 rigid transverse frame members and opposing substantially parallel right 226 and left 228 longitudinal bracing members fastened to the transverse frame members 222 and 224 thereby forming a rigid rectangular frame. The transverse frame 220 further includes opposing substantially parallel left 230 and right 232 pivot posts each having a bottom end fixedly attached to the front transverse frame member 222 an a top end extending substantially vertically up there from. The left and right pivot posts 230 and 232 are each formed with through holes 234 extending through the top ends thereof and the through holes 234 have a common axis corresponding with a pivot axis 236. The transverse frame 220 further includes a pair of forward extending brackets 238 usable to attach additional elements onto the transverse frame 220 as required. A spring 211 attaches at one end to the upper transverse brace member 210 of forward extending frame 200, and the second end of spring 211 attaches to a rear transverse frame number 224 of transverse frame 220. When the raking attachment 150 is traveling, the spring 211 prevents the combination of the transverse frame 220 and the forward extending frame 200 from creating vibrations. Further, the spring 211 prevents the rake tines 248, 254 of the rake assembly 240 from touching the ground especially when backing up. The spring 211 has an outside diameter of 1⅜ inches and it is 7 inches long; the gauge is 0.207.

Referring to FIGS. 1-3, the rake assembly 240 includes two upper 242 and two lower 244 conventional rake heads with the two upper rake heads 242 disposed side by side across a transverse width of the rake assembly and the two lower rake heads 244 disposed side by side across a transverse width of the rake assembly 240 and slightly longitudinally forward of the two upper rake heads 242. The four rake heads 242, 244 perform a better quality raking function than just two rake heads.

All four rake heads are substantially identical and include a relatively stiff mounting portion 246 and a row of flexible rake tines 248 fanning out from the relative stiff mounting portion 246. In the example embodiment, the row of flexible rake tines 248 formed by each rake head is semi circular about a center axis 250 and the center axis 250 of each rake head is oriented substantially parallel with the path of forward movement of a power lawnmower 102. The rake heads may comprise unitary plastic or metal elements or may comprise composite elements.

The two upper rake heads 242 attach to the front and rear transverse frame members 222 and 224 with suitable fasteners. The two lower rake heads 244 are positioned in mating contact with the two upper rake heads 242 and attached to the front and rear transverse frame members 222 and 224 with fasteners suitable for passing through holes in the upper rake heads 242. Alternately, the rake heads may be attached to only the front transverse frame member 222. Preferably all of the rake head attaching fasteners are easily removed to periodically change the rake heads when they become worn or damaged.

The upper rake heads 242 are attached to the transverse frame members with the flexible rake tines thereof forming a first row of rake tines 252 and the lower rake heads 244 are attached to the transverse frame 220 members with the flexible rake tines thereof forming a second row of rake tines 254, longitudinally offset from the first row of rake tines 252. In operation, the second row of rake tines 254 rakes the ground or grass first and the first row of rake tines 252 rakes the ground or grass second. In addition, the rear transverse frame member 224 approximately contacts the two upper rake heads 242 along the boundary between the relatively stiff mounting portion 246 and the flexible rake tines 248. Accordingly, as the transverse frame 220 is pivoted about the pivot axis 236 the rear transverse frame member 224 causes a downward force to act on the boundary between the relatively stiff mounting portion 246 and the flexible rake tines 248 to thereby increase a contact force between the flexible rake tines and the ground surface. As the pivot angle changes, distal ends of the flexible rake tines change height with respect to the ground surface until contact is made with the ground surface. Thereafter, further changes in the pivot angle increase the downward force that the distal ends of the flexible rake tines make with the ground surface. Further pivot angle changes bend the rake tines along their length. When two rows of rake tines are used, the downward force of both rows is increased.

Referring to FIG. 3, the valve tines 248 of rake head 242 and the rake tines 254 of the head 244 are in full contact with the ground or grass. The pair of rake heads 244 create high pressure to loosen all debris from below the grass and the pair of rake heads 242 help bring debris on top of the grass and create a cleaning path helping the mowing suction.

Referring now to FIGS. 3 and 4, a pivot assembly 260 provides a pivot joint between the forward extending frame 200 and the transverse frame 220 such that the rake assembly 240 can be pivoted over a range of pivot angles. A pivot handle 262 extends from the pivot assembly 260 to a position that is accessible to a user operating the power lawnmower 102, e.g. within reach of a user sitting on the seat 114. The pivot handle 262 also engages with a handle support 264, which is fixedly attached to the forward extending frame 200. Movement of the pivot handle 262 pivots the transverse frame 220 and the rake assembly 240 about the pivot axis 236 thereby pivoting or tilting the rake assembly 240 with respect to the ground surface and with respect to the forward extending frame 200.

Referring to FIG. 4, a top view of the pivot assembly 260 shows the longitudinal frame members 202, with coaxial holes passing therethrough to form the first attaching points 208. The pivot assembly 260 further includes the left pivot post 230, the right pivot post 232 and a pivot rod 266. The pivot rod 266 extends through opposing coaxial holes 234 formed through each pivot posts at top ends thereof and through the attaching points 208. The pivot rod 266 is fixedly attached to a handle bracket 268 by pins or bolts 270, and the handle bracket 268 couples the pivot rod 266 to the pivot handle 262 with a pivot pin 272. Both the pivot handle 262 and the pivot pin 272 are configured to pivotally attach the pivot handle 262 to the handle bracket 268 for pivoting the end of the pivot handle 262 where it attaches to the handle bracket 268. The pivot assembly 260 includes connecting rods 274 passing through opposing walls of the left pivot post 230 and the right pivot post 232 and through the pivot rod 266. The connecting rods 274 as well as corresponding holes through the left and right pivot posts and the pivot rod are configured to provide a snug fit to rigidly attach the pivot rod 266 to each of the pivot posts such that rotation of the pivot rod 266 about the pivot axis 236 is substantially transferred to the entire transverse frame 220 and rake assembly 240. The connecting rods 274 may comprise bolts held in place by nuts 276 or pins pressed, bonded, clamped or otherwise held in place.

Referring to FIGS. 1 and 4, the pivot handle support 264 is attached to the forward extending frame 200. The pivot handle support 264 comprises a substantially vertically extending structural bracket formed with a plurality of slotted detents 278 positioned to receive the pivot handle 262 engaged therein and to hold the pivot handle 262 in a fixed operating position while it is engaged in a detent 278. The slotted detents 278 correspond with various pivot handle positions and each pivot handle position corresponds with a different pivot angle of the rake assembly 240. To move the pivot handle 262 from engagement with one slotted detent 278 and into engagement with another slotted detent 278, a user pushes a pivot handle top end 280 to the left to disengage the pivot handle with a detent 278. The pushing action to the left pivots a pivot handle bottom end 282 about the pin 272. The user then lifts or lowers the pivot handle top end 280 to engage the pivot handle with another slotted detent 278 thereby changing the pivot angle of the rake assembly 240.

Referring now to FIGS. 2 and 3, in the example of the pivot handle support 264, a top detent 284 supports the rake assembly 240 in a non-operating position. More specifically, the transverse frame 220 and rake assembly 240 are held at a pivot angle that tilts the rake heads 242, 244 away from contact with the ground surface and preferably away from contact with the grass being cut. In operation, the user moves the pivot handle 262 to the top detent 284 while driving the power lawnmower in reverse or when the power lawnmower is not operating to cut grass. Otherwise, the pivot handle support 264 includes at least one detent that supports the rake assembly 240 in an operating position wherein all the top rake heads 242 and the bottom rake heads 244 are in contact with the ground surface or slightly above the ground surface but engaged with the grass being prepared for cutting. In particular, the handle support 264 includes a plurality of detents 278 corresponding with a plurality of operating positions and each operating position supports the rake assembly at a different pivot angle. In particular the operating positions range from placing the first and second rows of rake tines 252, 254 just above the ground surface but engaged with the grass to be cut to forcing the rows of rake tines 252, 254 into contact with the ground surface to increase a contact force between the rows of rake tines 252, 254 and the ground surface. A spring 203 attaches at one end near a lower end of the pivot handle 262 and the second end of spring 203 attaches to the longitudinal member 202 of the forward extending frame 200. The spring 203 prevents the pivot handle 262 from jumping out of one of the detents 278 of the handle support 24. The spring 203 has an outside diameter of ⅞ inches and it is 6 inches long; the gauge is 0.207.

Figure 5:
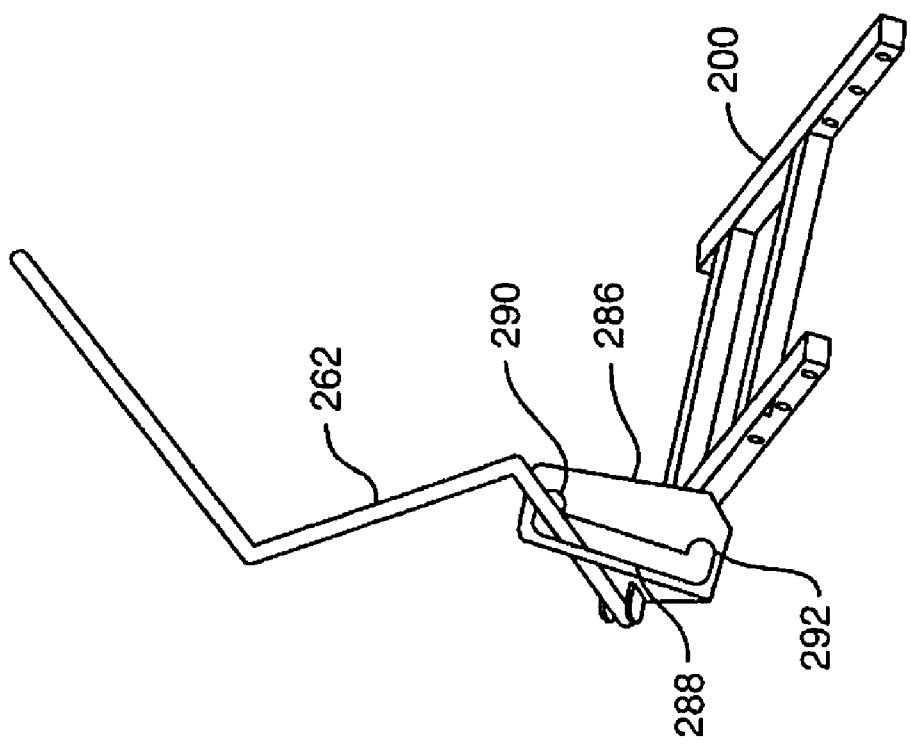
FIG. 5 illustrates a rear isometric view of an alternate embodiment of a raking accessory forward extending frame according to the present invention.

Referring now to FIG. 5, an alternate embodiment of a pivot handle holder 286 is shown attached to the forward extending frame 200 with the pivot handle 262 engaged with a closed guide slot 288. The closed guide slot 288 includes a top detent position 290 for holding the rake heads 242, 244 lifted in a non-operating position and a bottom detent 292 for holding the rake heads 242, 244 in a raking operating position. The closed guide slot 288 captures the pivot handle 262 in the guide slot to prevent the handle from being dropped by the user or bumped out of engagement with a detent. The closed guide slot 288 may also include additional operating detent positions as described above.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications, e.g. as a raking attachment for a power lawnmower, those skilled in the art will recognize that its usefulness is not limited thereto and that the present invention can be beneficially utilized in any number of environments and implementations where it is desirable to rake or perform other tasks in the path of forward movement of a lawnmower or other lawn or garden care device. Accordingly, the claims set forth below should be construed in view of the full breadth and spirit of the invention as disclosed herein.

What is claimed is:

1. A lawn care device comprising:
a power lawnmower having a mower frame supported above a ground surface on a plurality of drive wheels, a power lawn care deck attached to the mower frame and a motive drive system attached to the mower frame and interconnected with at least one of the plurality of drive wheels for driving the power lawnmower in forward and rearward driving directions and wherein the motive drive system also drives elements of the power lawn care deck to perform lawn care tasks;
a forward extending frame comprising one or more longitudinal frame members each having a first end rigidly attached to the mower frame and a second end extending longitudinally forward from the first end to provide one or more first attaching points rigidly supported in a path of forward movement of the lawn care deck at a substantially fixed height above the ground surface;
a transverse frame, pivotally attached to the forward extending frame at the one or more first attaching points, comprising one or more transverse frame members disposed substantially orthogonal to the one or more longitudinal frame members;
a rake assembly attached to said transverse frame comprising at least one row of flexible rake tines disposed across the entire transverse width of the power lawn care deck in the forward path thereof for raking the path of forward movement of the lawn care device;
a pivot rod pivotally extending through the one or more first attaching points and fixedly attached to the transverse frame for pivoting the transverse frame and the rake assembly about a longitudinal axis of the pivot rod, wherein a range of pivoting motion of the rake assembly extends from a non-operating pivot angle wherein the at least one row of flexible rake tines is pivoted to a non-raking position, to one or more pivot angles wherein the at least one row of flexible rake tines is pivoted to one or more raking positions and wherein each of the one or more raking positions forces the at least one row of flexible rake tines to contact a ground surface with a different downward force;
a pivot handle disposed at a location accessible to a user operating the lawn care device;
a pivot handle support element attached to the longitudinal frame and configured to support the pivot handle at various support positions each corresponding with a pivot angle in the range of pivoting motion of the rake assembly;
wherein the pivot handle pivots around a point that lies on the longitudinal axis of the pivot rod;
a handle bracket fixedly attached to the pivot rod;
wherein the at least one row of flexible rake tines comprises:
a first row of flexible rake tines formed by two upper rake heads attached to the transverse frame;
a second row of flexible rake tines formed by two lower rake heads attached to the transverse frame through holes in the two upper rake heads; and,
wherein the first row and the second row are offset longitudinally such that each of the first row and the second row of flexible rake tines rake the entire transverse width of the power lawn care deck in the forward path thereof;
wherein the pivot handle support element includes:
a first detent for supporting the pivot handle in a first support position corresponding with supporting the rake assembly at the non-raking position;
a second detent for supporting the pivot handle in a second support position corresponding to one of the one or more pivot angles wherein the at least one row of flexible rake tines is pivoted to a raking position;
wherein the forward extending frame comprises:
two substantially parallel longitudinal frame members for attaching to the mower frame at first ends thereof and for providing two first attaching points at second ends thereof; and
two substantially parallel transverse brace members extending between and rigidly attached to each of the longitudinal frame members to form a first rigid rectangular frame;
a pair of frame mounts fixedly attached to the mower frame on opposing sides thereof for coupling with the first ends of the two longitudinal frame members to attach the forward extending frame to the lawn care device and align the forward extending frame to position the two first attaching points at a design height above the ground surface;
wherein the transverse frame comprises:
the one or more transverse frame members being opposing substantially parallel front and rear rigid transverse frame members;
opposing substantially parallel left and right longitudinal frame members fastened to the opposing transverse front and rear frame members and thereby forming a second rigid rectangular frame; and
opposing substantially parallel left and right pivot posts each having a bottom end fixedly attached to the front transverse frame member, a top end extending substantially vertically up from the bottom end and a pair of coaxially aligned through holes extending there through at the top ends for receiving the pivot rod there through.

2. The lawn care device of claim 1 wherein each of the two upper rakes heads and the two lower rake heads is substantially identical and comprise a relatively stiff mounting portion with a row of flexible rake tines fanning out from the relative stiff mounting portion and further wherein the relatively stiff mounting portion of each of the two upper rake heads and the two lower rake heads is fixedly attached to the front rigid transverse frame member with the rear rigid transverse frame member approximately contacting the two upper rake heads along a boundary between the relatively stiff mounting portion and the row of flexible rake tines to thereby apply a downward force on the boundary in response to varying the pivot angle of the transverse frame.

3. The lawn care device of claim 2 wherein the pivot handle support element comprises a substantially vertically extending structural bracket formed with a plurality of slotted detents positioned to receive the pivot handle engaged therein and to hold the pivot handle in a fixed position while it is engaged with one of the plurality of slotted detents and wherein each of the plurality of slotted detents holds the pivot handle in a position corresponding with a desired pivot angle of the rake assembly.

4. The lawn care device of claim 3 wherein the handle support includes:
a top detent for supporting the pivot handle in a first position corresponding with supporting the rake assembly in a non-raking position; and,
a bottom detent for supporting the pivot handle in a second position corresponding with supporting the rake assembly in a first raking position for applying a first downward force on the boundary.

5. The lawn care device of claim 4 wherein the handle support includes an intermediate detent for supporting pivot handle in a third position corresponding with supporting the rake assembly in a second raking position wherein the second raking position applies a second downward force on the boundary wherein the second downward force is less than the first downward force.

6. A raking attachment for a rider mower that includes a mower frame and a cutting deck comprising:
   a forward extending frame comprising one or more longitudinal frame members each having a first end rigidly attached to the mower frame and a second end extending longitudinally forward from the first end to provide one or more first attaching points rigidly supported in a path of forward movement of the cutting deck at a substantially fixed height above the ground surface;
   a transverse frame, pivotally attached to the forward extending frame at the one or more first attaching points, comprising one or more transverse frame members disposed substantially orthogonal to the one or more longitudinal frame members;
   a rake assembly attached to said transverse frame comprising at least one row of flexible rake tines disposed across the entire transverse width of the cutting deck in the forward path thereof for raking the path of forward movement of the cutting deck;
   a pivot rod pivotally extending through the one or more first attaching points and fixedly attached to the transverse frame for pivoting the transverse frame and the rake about a longitudinal axis of the pivot rod, wherein a range of pivoting motion of the rake assembly extends from a non-operating pivot angle, wherein the at least one row of flexible rake tines is pivoted to a non-raking position, to one or more pivot angles wherein the at least one row of flexible rake tines is pivoted to one or more raking positions and wherein each of the one or more raking positions forces the at least one row of flexible rake tines to contact a ground surface with a different downward force;
   a pivot handle disposed at a location accessible to a user operating the rider mower;
   a pivot handle support element attached to the longitudinal frame and configured to support the pivot handle at various support positions each corresponding with a pivot angle in the range of pivoting motion of the rake assembly;
   wherein the pivot handle pivots around a point that lies on the longitudinal axis of the pivot rod;
   a handle bracket fixedly attached to the pivot rod;
   wherein the at least one row of flexible rake tines comprises:
   a first row of flexible rake tines formed by two upper rake heads attached to the transverse frame;
   a second row of flexible rake tines formed by two lower rake heads attached to the transverse frame through holes in the two upper rake heads; and,
   wherein the first row and the second row are offset longitudinally such that each of the first row and the second row of flexible rake tines rake the entire transverse width of the cutting deck in the forward path thereof;
   wherein the pivot handle support element includes:
   a first detent for supporting the pivot handle in a first support position corresponding with supporting the rake assembly at the non-raking position; and,
   a second detent for supporting the pivot handle in a second support position corresponding to one of the one or more pivot angles wherein the at least one row of flexible rake tines is pivoted to a raking position;
   wherein the forward extending frame comprises:
   two substantially parallel longitudinal frame members for attaching to the mower frame at first ends thereof and for providing two first attaching points at second ends thereof;
   two substantially parallel transverse brace members extending between and rigidly attached to each of the two longitudinal frame members to form a first rigid rectangular frame;
   a pair of frame mounts fixedly attached to the mower frame on opposing sides thereof for coupling with the first ends of the two longitudinal frame members to attach the forward extending frame to the lawn care device and align the forward extending frame to position the two first attaching points at a design height above the ground surface;
   wherein the transverse frame comprises:
   the one or more transverse frame members being opposing substantially parallel front and rear rigid transverse frame members;
   opposing substantially parallel left and right longitudinal frame members fastened to the opposing transverse front and rear frame members and thereby forming a second rigid rectangular frame; and
   opposing substantially parallel left and right pivot posts each having a bottom end fixedly attached to the front transverse frame member, a top end extending substantially vertically up from the bottom end and a pair of coaxially aligned through holes extending there through at the top ends for receiving the pivot rod there through.

7. The raking attachment of claim 6 wherein each of the two upper rakes heads and the two lower rake heads is substantially identical and comprise a relatively stiff mounting portion with a row of flexible rake tines fanning out from the relative stiff mounting portion and further wherein the relatively stiff mounting portion of each of the two upper rake heads and the two lower rake heads is fixedly attached to the front rigid transverse frame member with the rear rigid transverse frame member approximately contacting the two upper rake heads along a boundary between the relatively stiff mounting portion and the row of flexible rake tines to thereby apply a downward force on the boundary in response to varying the pivot angle of the transverse frame.

8. The raking attachment of claim 7 wherein the pivot handle support element comprises a substantially vertically extending structural bracket formed with a plurality of slotted detents positioned to receive the pivot handle engaged therein and to hold the pivot handle in a fixed position while it is engaged with one of the plurality of slotted detents and wherein each of the plurality of slotted detents holds the pivot handle in a position corresponding with a desired pivot angle of the rake assembly.

9. The raking attachment of claim 8 wherein the handle support includes:
   a top detent for supporting the pivot handle in a first position corresponding with supporting the rake assembly in a non-raking position; and,
   a bottom detent for supporting the pivot handle in a second position corresponding with supporting the rake assembly in a first raking position for applying a first downward force on the boundary.

10. The raking attachment of claim 9 wherein the handle support includes an intermediate detent for supporting pivot handle in a third position corresponding with supporting the rake assembly in a second raking position wherein the second raking position applies a second downward force on the boundary wherein the second downward force is less than the first downward force.

11. A method of raking comprising the steps of:

supporting a forward extending frame comprising one or more longitudinal frame members attached to a lawnmower in a path of forward movement of a cutting deck of the lawnmower wherein the forward extending frame provides one or more first attaching points rigidly supported at a substantially fixed height above a ground surface in the path of forward movement of the cutting deck;

supporting a transverse frame pivotally attached to the forward extending frame at the one or more first attaching points, wherein the transverse frame comprises transverse frame members being opposing substantially parallel front and rear rigid transverse frame members, opposing substantially parallel left and right longitudinal frame members fastened to the opposing transverse front and rear frame members and thereby forming a rigid rectangular frame, opposing substantially parallel left and right pivot posts each having a bottom end fixedly attached to the front transverse frame member, a top end extending substantially vertically up from the bottom end and a pair of coaxially aligned through holes extending there through at the top ends for attachment with the one or more first attaching points of the forward extending frame;

supporting a rake assembly on the transverse frame wherein the rake assembly includes at least one row of flexible rake tines disposed across the entire transverse width of the cutting deck in the forward path thereof for one of sweeping, scraping, thatching and aerating the path of forward movement of the cutting deck;

supporting a pivot rod pivotally extending through the one or more first attaching points and fixedly attached to the transverse frame through the holes of the left and right pivot posts for pivoting the transverse frame and the rake assembly about a longitudinal axis of the pivot rod;

supporting a pivot handle disposed at a location accessible to a user operating the lawnmower, wherein the pivot handle is disposed between the transverse frame and the location accessible to the user operating the lawnmower, wherein the movement of the pivot handle by the user varies pivot angles of the rake assembly over a desired range of pivot angles;

pivoting the rake assembly using the pivot handle to a plurality of different raking positions according to the raking application wherein each raking position forces the at least one row of flexible rake tines to contact a ground surface with a different downward force, wherein the pivot handle pivots around a point that lies on the longitudinal axis of the pivot rod;

supporting a pivot handle support element attached to the longitudinal frame and configured to support the pivot handle at various support positions each corresponding with a pivot angle in the range of pivoting motion of the rake assembly;

engaging or disengaging the pivot handle with the pivot handle support element.

* * * * *